J. KONCUR.
DIRECTION INDICATOR.
APPLICATION FILED AUG. 6, 1920.
1,370,652.
Patented Mar. 8, 1921.
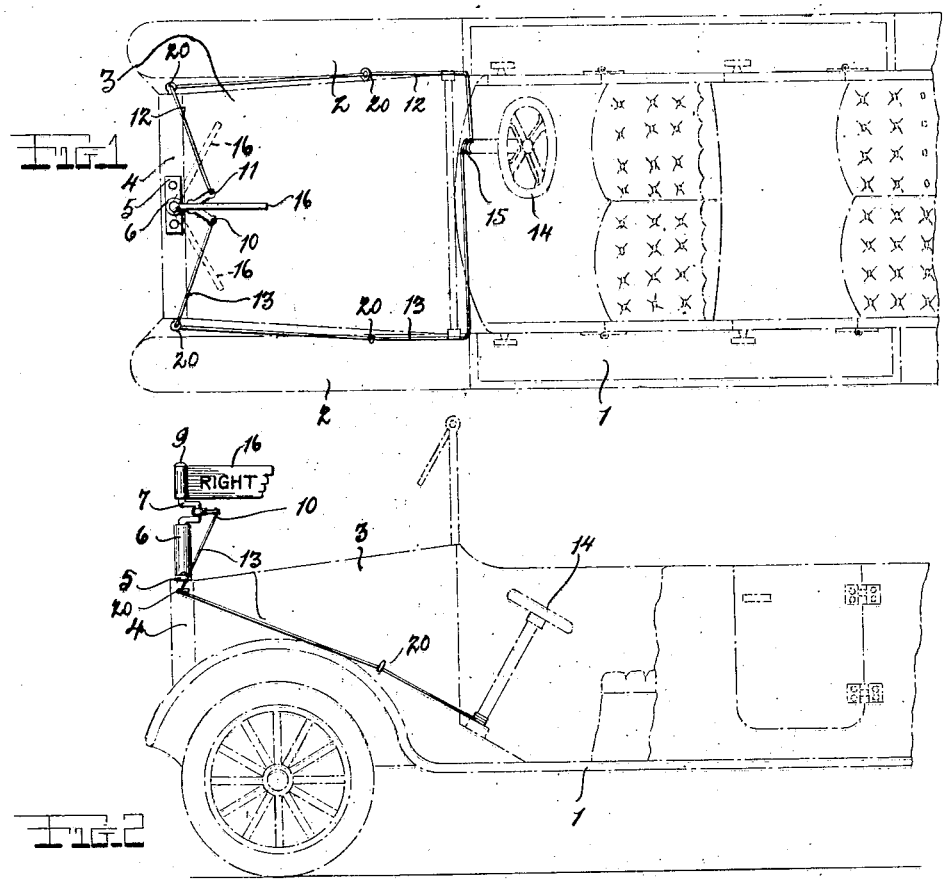
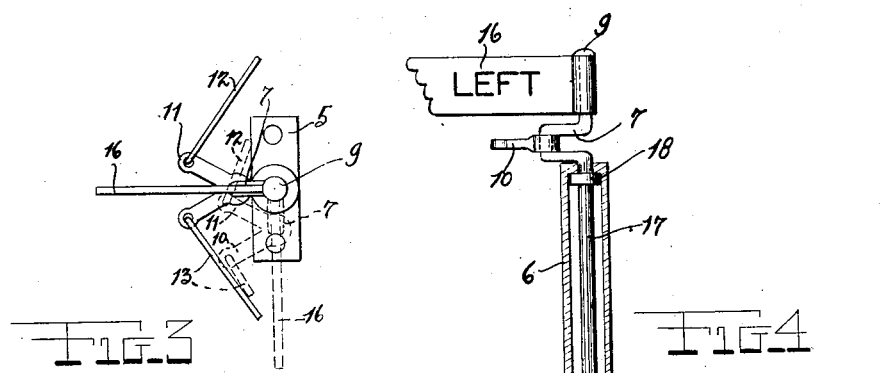
INVENTOR
J. Koncur
BY
his ATTORNEYS

UNITED STATES PATENT OFFICE.

JOSEF KONCUR, OF ELIZABETHPORT, NEW JERSEY.

DIRECTION-INDICATOR.

1,370,652.

Specification of Letters Patent.

Patented Mar. 8, 1921.

Application filed August 6, 1920. Serial No. 401,808.

*To all whom it may concern:*

Be it known that I, JOSEF KONCUR, a citizen of Poland, and resident of Elizabethport, in the State of New Jersey, have invented certain new and useful Improvements in Direction-Indicators, of which the following is a specification.

The main object of this invention is to provide a device at the front of a vehicle and means whereby the same is automatically operated by the motion of the steering wheel to indicate the direction in which the vehicle is about to turn.

The above and other objects will become apparent in the description below, in which characters of reference refer to like-named parts in the drawings.

Referring briefly to the drawings, Figure 1 is a plan view of an automobile equipped with my device.

Fig. 2 is a side elevational view of the same.

Fig. 3 is a plan view of my device *per se*, illustrating its operation.

Fig. 4 is an elevational view of my device *per se* and a cross-sectional view of the means whereby the same is attached to the radiator of the vehicle.

Referring now in detail to the drawings, 1 represents the body of an automobile, 2 the fenders, 3 the hood, and 4 the radiator thereof. A hollow frame 6 is mounted on the radiator as shown, the same having a base plate 5 riveted thereon. A rod 17 having its lower end tapered and resting upon a conical bearing 19. A sleeve 18 is rigid to said rod in the upper portion of the said frame, and serves to prevent withdrawal of the rod through the top of the frame. As said rod extends upward from the frame 6 it is bent into a U-shape indicated at 7, and then again extends vertically upward, ending in a stem 9 upon which a sign panel 16 is secured, bearing the words "left" and "right" on its respective sides.

A V-shaped member having arms 10 and 11 is pivotally mounted upon the rod 17 about the vertical portion of the U-shaped bend 7, and to the ends of said arms are attached cords 13 and 12, respectively. Guiding eyelets 20 are secured to the sides of the radiator 4 and the hood 3, through which the said cords pass rearward, the latter being secured to diametrically opposite sides of the stem of the steering wheel 14, and being partly wound on said stem in mutually opposite peripheral directions, as seen at 15.

Now it is apparent that when the wheel 14 is turned toward the right the V-shaped member will glide to the right and carry the U-shaped bend, and therefore the rod 17, with it through substantially a quadrant. Therefore the sign panel 16 will extend toward the right, and the word "right" will appear on the forward side of the sign, indicating to those passing in the opposite direction, or on the side of the vehicle, that the latter is about to turn toward the right. Similarly, when the wheel is turned to the left, the panel 16 will swing to the left and the word "left" will appear to those passing in the opposite direction.

The same device may be applied to the rear of the vehicle, so that vehicles in the rear may also be warned about the turning of the vehicle.

Because of the simplicity of construction and operation of my device it may readily be applied to any automobile for immediate use.

I claim:

A device of the class described comprising a hollow frame adapted to be secured to the radiator of a vehicle, a rod vertically mounted in said frame, said rod extending above said frame and having a U-shaped bend therein, a V-shaped member pivotally mounted upon said rod about the said U-shaped portion, means connecting said V-shaped member with opposite sides of the stem of the steering wheel, and a sign panel on the uppermost end of said rod.

Signed at New York, in the county of New York and State of New York.

JOSEF KONCUR.